United States Patent [19]

Yamashita et al.

[11] 3,857,632

[45] Dec. 31, 1974

[54] REAR VISION MIRROR APPARATUS HAVING A FILTER FOR AUTOMOBILE

[75] Inventors: Makoto Yamashita, Sagamihara; Kenkicki Ikura, Yokohama; Masagoro Kushida, Isehara, all of Japan

[73] Assignee: Ichiko Industries Limited, Tokyo, Japan

[22] Filed: Sept. 25, 1972

[21] Appl. No.: 291,625

[30] Foreign Application Priority Data
Oct. 11, 1971    Japan.............................. 46-90026

[52] U.S. Cl................. 350/302, 350/301, 350/288, 350/299
[51] Int. Cl. ............................................ G02b 5/08
[58] Field of Search ........... 350/302, 307, 311, 290, 350/313, 276–280, 266, 283, 61; 351/62

[56] References Cited
UNITED STATES PATENTS

| | | | |
|---|---|---|---|
| 1,587,144 | 6/1926 | Burk................................... | 350/276 |
| 1,635,367 | 7/1927 | Tourrette........................... | 350/276 |
| 2,220,429 | 11/1940 | Soderberg......................... | 350/276 |
| 2,525,012 | 10/1930 | Armstrong......................... | 350/283 |
| 2,737,847 | 3/1956 | Tesauro.............................. | 351/57 |
| 3,043,195 | 7/1962 | Moultrie............................ | 350/302 |
| 3,410,602 | 11/1968 | Schuler.............................. | 350/276 |
| 3,498,697 | 3/1970 | Matteo............................... | 350/302 |
| 3,515,579 | 6/1970 | Shepherd et al.................... | 351/62 |
| 3,686,473 | 8/1972 | Shirn et al. ......................... | 350/61 |
| 3,773,406 | 11/1973 | Baumgardner..................... | 350/302 |

FOREIGN PATENTS OR APPLICATIONS
524,196    7/1940    Great Britain....................... 350/61

*Primary Examiner*—Ronald L. Wibert
*Assistant Examiner*—Michael J. Tokar
*Attorney, Agent, or Firm*—Wenderoth, Lind & Ponack

[57] ABSTRACT

A rear vision mirror apparatus of periscope type to provide a rear field of vision via the roof top of an automobile, is disclosed: a cylindrical housing fixed to the roof top and having an open rear end and an open front lower portion opening into an upper part of the driver's chamber; an objective mirror and a reflecting mirror arranged in said housing; an eye-piece mirror provided below said open front lower portion of the housing for receiving the incident light transmitted by the objective mirror and the reflecting mirror; at least two filters provided between the reflecting mirror and the eye-piece mirror and arranged in such a way that the filters may be selectively positioned either in a direction transverse to the path of the light or in a position out of the path of light. The rear field of vision may be obtained by the use of none one or both of the filters. These filters have spectral light transmission characteristics which are different from each other and are intended to prevent dazzlement due to headlights during the night time and to reduce the amount of intensive solar rays in summer time.

6 Claims, 10 Drawing Figures

REAR VISION MIRROR APPARATUS HAVING A FILTER FOR AUTOMOBILE

BACKGROUND OF THE INVENTION a. Field of the invention

The present invention pertains to a rear vision mirror apparatus for automobiles, and more particularly, it relates to a rear vision mirror apparatus of periscope type having a rear view window provided on the roof top of an automobile and having an optical system contained therein to enable the driver of the automobile to have a clear view to the rear thereof through this window.

b. Description of the prior art

In an automobile, a system is generally provided in order for the driver to be able to view rearwardly of the automobile by means of a room mirror positioned at the forward central portion of the driver's chamber and also by means of outside mirrors secured externally on both sides of the body of the automobile. However, this room mirror is arranged so that the driver can have a view to the rear of the automobile through the rear window of the automobile. Accordingly, the field of vision is limited depending on the dimension of the rear window. Especially, in case safety head rests are provided on the rear seat and/or when there are passengers seated in the passenger's chamber and/or in case there are some articles placed on the rack behind the passenger's seat adjacent to the rear window, the rear field of vision is obstructed markedly. On the other hand, the outside mirrors offer a compensatory effect of the room mirror and each of them provides a rear view on either side of the vehicle. However, because these outside mirrors are positioned substantially remote from the position of the room mirror, there is the inconvenience that, if it is intended to observe the entire condition of the traffic, the driver has to look in two different directions, left and right, alternatively.

In order to eliminate the foregoing defects and disadvantages of the prior art comprising a room mirror and two outside mirrors, there has been proposed a rear viewing apparatus of the so-called periscope type comprising a rear view opening portion provided on the roof top of an automobile and a plurality of optical systems arranged so that the driver at his driving position is enabled to have a view to the rear of the automobile through said opening.

Rear viewing apparatuses of periscope type which use, as their optical system, a combination of a plurality of planar mirrors are known from, for example, U.S. Pat. No. 2,252,161, U.S. Pat. No. 3,229,580 and British Patent No. 924,721. In order to obtain a broad rear field of vision by the use of planar mirrors, it is necessary to use an objective mirror having a very large mirror surface area such as 300 mm (vertical) × 750 mm (horizontal). If a mirror having such a reflection factor as will provide an appropriate image during the daytime is used, it will be quite dangerous during the night time because the light rays from glaring headlights are reflected onto the driver's eyes from the aforesaid large reflecting area of the objective mirror, so that the driver may be dazzled by the light.

It is widely known in the field of room mirror to prevent the drivers from being dazzled due mainly to the glaring light of headlights during the night time by the provision of a prism mirror having high and low reflection factors and by switching the reflection from high to low and vice versa depending on whether it is daytime or night time. However, a changeover mirror of this type is in general complicated in structure and has various problems when applied to a rear viewing mirror arrangement having a very broad mirror surface such as the periscope type.

SUMMARY OF THE INVENTION

It is, therefore, a primary object of the present invention to provide a rear vision mirror apparatus in which the optical system and filters are incorporated within a single cylindrical housing and which provides a good rear field of vision by merely being attached to the body of an automobile and which exerts an effective dazzlement-preventing function by the selective use of these filters.

Another object of the present invention is to provide a rear vision mirror apparatus of the type described, which not only is capable of preventing dazzlement due to glaring headlights during the night time, but also is capable of providing an agreeable image to the eyes of the driver by the fact that, when the mirror receives intensive solar rays during the daytime in the summer season, the amount of light to be reflected by the mirror is appropriately adjusted in accordance with the intensity of the incident light rays.

Still another object of the present invention is to provide a rear vision mirror apparatus of the type described, which allows the filters to be easily set to their position of use and to their non-use position, and which insures that, once the filters are set to such positions, they can be held there firmly.

These as well as other objects and attendant advantages of the present invention will become apparent by reading the following detailed description of the preferred embodiments when taken in conjunction with the accompanying drawings.

BRIEF DESCRIPTION OF THE DRAWINGS

FIG. 4 is viewed in the direction of the arrow.

DETAILED DESCRIPTION OF THE PREFERRED EMBODIMENTS

Figure 1:
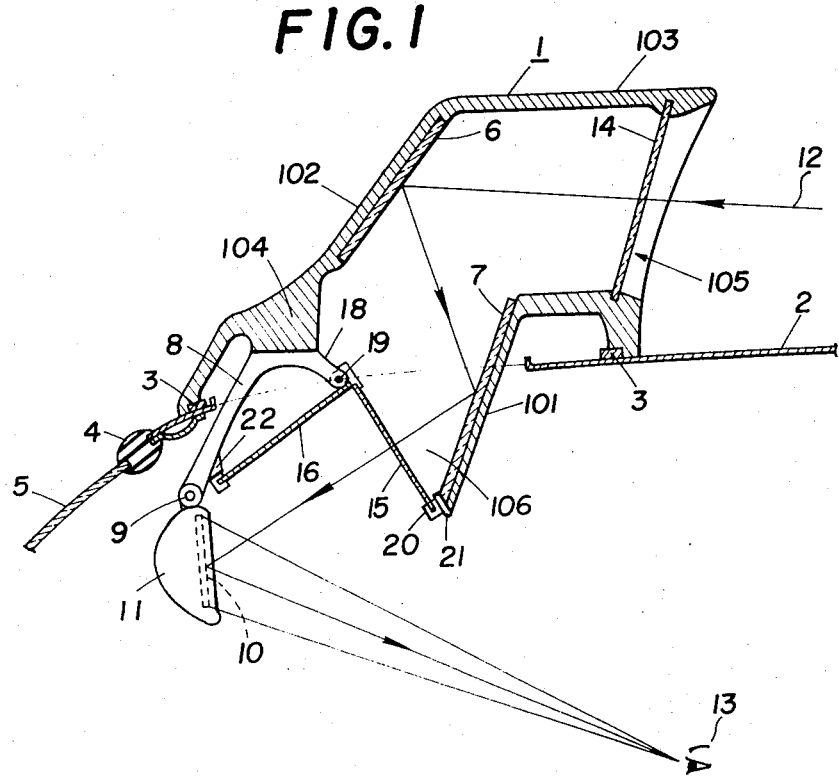
FIG. 1 is a vertical sectional view showing an embodiment of the rear vision mirror apparatus of the present invention.

In FIG. 1, 1 represents a housing made with a synthetic resin molded into an integral structure. This housing 1 is composed of a lower rear wall 101 slanting obliquely forwardly, an upper front wall 102 slanting in the same fashion, an upper wall 103 extending rearwardly from the upper end of said upper front wall 102, and a supporting seat member 104. This housing has an opening 105 formed at the upper rear end thereof and another opening 106 formed in the foreground of said lower rear wall 101, respectively. This housing 1 is liquid-tightly secured via seal packings 3, 3 to the roof top 2 of an automobile. Also, the forward portion of this roof 2 is connected to the front window pane 5 via a seal rubber member 4 in a well known manner.

On the inner surface of the upper front wall 102 of the housing 1 is fixed a planar objective mirror 6. Also, on the inner surface of the lower rear wall 101 is fixed a similar planar reflecting mirror 7. A stay 8 is secured to the lower face of the supporting seat member 104. A mirror holder 11 which supports an eye-piece mirror 10 is pivotably secured via a pin 9 to the lowermost end of this stay 8.

Said eye-piece mirror 10 is positioned at an upper portion in the foreground of the driver's seat. Also, the objective mirror 6 and the reflecting mirror 7 are arranged such that the incident light beams 12 coming from the rearward field of vision of the automobile impinge onto the eye-piece mirror 10 after being reflected by the objective mirror 6 and the reflecting mirror 7. Accordingly, the image of the rearward field of vision relative to the automobile is projected onto the eye-piece mirror 10 by the objective mirror 6 and reflecting mirror 7. This projected image can be viewed by the eyes 13 of the driver. In addition, by either upwardly or downwardly pivoting the mirror holder 11 of the eye-piece mirror 10 about the pin 9, it is possible to adjust the rearward field of vision as required.

A transparent cover 14 made of either a synthetic resin or glass is mounted onto the open portion 105 of the upper rear end of the housing 1. 15 and 16 represent filters. Attachment fittings 17 and 17 are fixed to the opposite ends of each of these filters. These fittings 17 and 17 are pivotably secured by a shaft 19 to the foremost end of a support 18 which branches from the stay 8. A permanent magnet or a steel or iron piece 20 is fixed to the opposite free edge of each of these filters 15 and 16 in such a manner that this piece 20 nips the side edge of the corresponding filter. A steel piece or a permanent magnet 21 is fixed to the lower end face of the lower rear wall 101 of the housing at such a position as to correspond to the permanent magnet or said steel or iron piece 20 of the filter 15. Also, a steel piece or a permanent magnet 22 is fixed to an intermediate portion of the stay 8 of the eye-piece mirror at such a position as will correspond to the permanent magnet or the steel or iron piece 20 of the filter 16.

Figure 2:
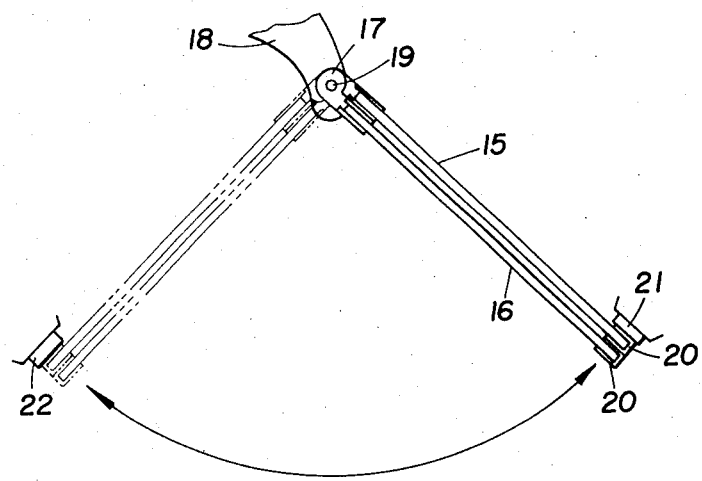
FIG. 2 is an illustration, on an enlarged scale, of a part of the apparatus.

With the foregoing arrangement, it is possible to have the two superimposed filters 15 and 16 attracted to and held by the permanent magnet 21 as indicated by the solid line of FIG. 2 to position these two filters transverse to the path of light leading from the reflecting mirror to the eye-piece mirror, or it is possible to have the two superimposed filters 15 and 16 attracted to and held by the permanent magnet 22 in a manner as shown by the chain line in FIG. 2 to hold these filters at positions removed from the path of light, or it is possible to position the filter 15 transverse to the path of light and to position the filter 16 irrelevant to the path of light as shown in FIG. 1.

Figure 3:
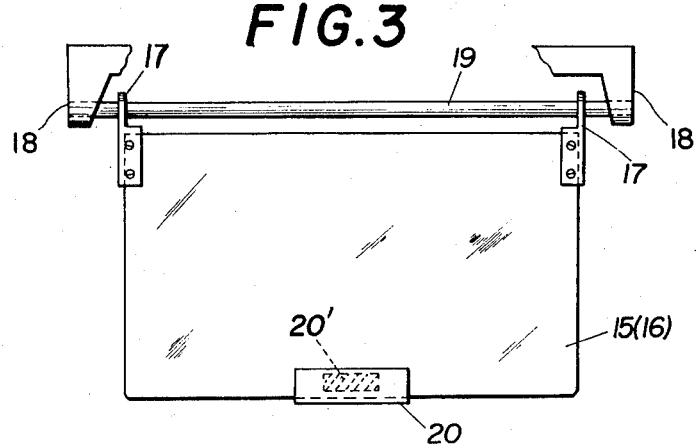
FIG. 3 is a plan view of the filter.

In case it is intended to use a plurality of filters each having a steel or iron piece attached thereto and to have them attracted to and held by a single permanent magnet, the magnet may fail to have a sufficient attracting force. In such a case, it is only necessary to attach another permanent magnet 20' to either one of the filters 16 and 15 as indicated by the dotted line in FIG. 3.

Figure 6:
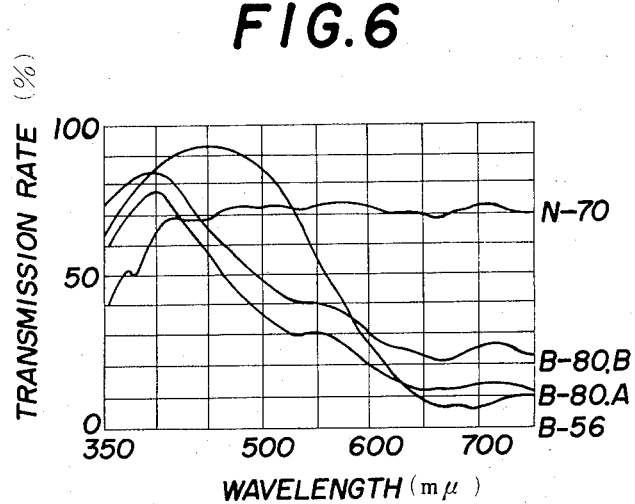
FIG. 6 is a chart showing the spectral light-transmission characteristics of the filters which can be used in the present invention.

The aforesaid filters 15 and 16 used in the present invention have different spectral transmission characteristics relative to each other. For example, the filter 15 is made of a filter No. N-70 made by Hoya Glass, Ltd. of Japan. On the other hand, the filter 16 is made of such a filter as the filter No. B-80A, or B-80B, or B-56 (all of which represent the products of said Hoya Glass, Ltd.). The filter of the No. N-70 type is capable of reducing the amount of light for all the visible light rays substantially independent of wavelength as shown in FIG. 6. Those filters of the type such as B-80A, B-80B and B-56, exhibit a high light transmission rate for light rays having a wavelength of 400-500 m$\mu$, but they have a low light transmission rate for light rays having a wavelength of 550-750 m$\mu$.

Figure 7:
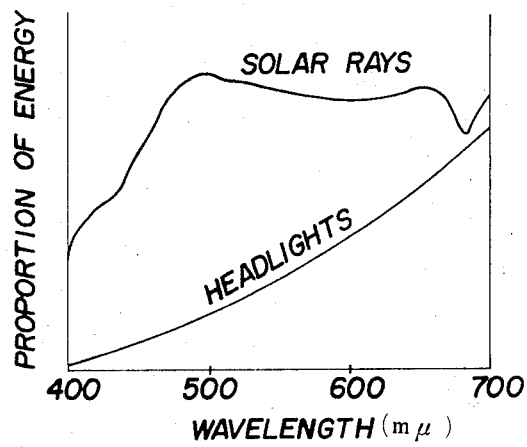
FIG. 7 is an explanatory illustration showing the spectral light distribution of both the headlights and solar rays.

The spectral light distributions of solar rays as well as the light rays of headlights are as shown in FIG. 7. Accordingly, in case only the filter 15 having the aforesaid light transmission characteristic is used, this filter will exhibit a substantially even light attrition effect. Also, in case only the filter 16 is used, the amount of those light rays of headlights is effectively reduced for that range of wavelength having a large output ratio, so that the intensity of the light of the headlight lamps can be mitigated to an extreme degree when passed through this filter as compared with other incident lights.

Therefore, under intensive solar rays in mid-summer, the filter 15 is set in a position transverse to the path of light leading from the reflecting mirror to the eye-piece mirror. As a result, the entire spectrum of visible light rays are uniformly reduced in intensity so that a gentle image which is not dazzling may be viewed. On the other hand, during the night time, the superimposed filters 15 and 16 are set so as to transverse the path of light leading from the reflecting mirror. By doing so, it is possible to effectively reduce the intensity of glaring light from headlight lamps to thereby prevent dazzlement.

Figure 4:
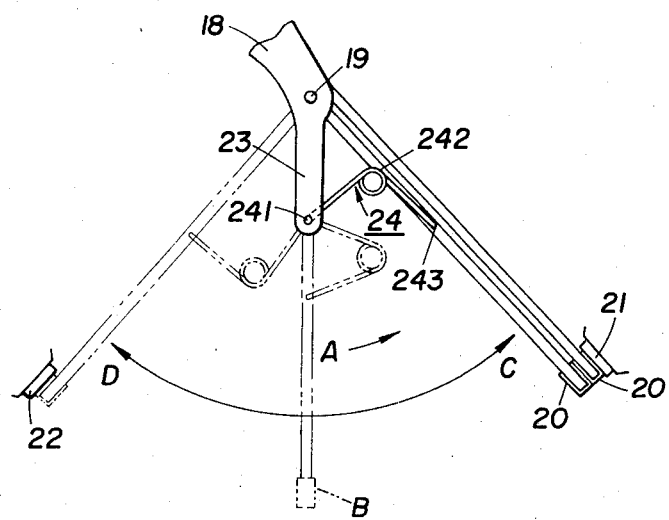
FIG. 4 is an illustration similar to FIG. 2, showing another example.
Figure 5:
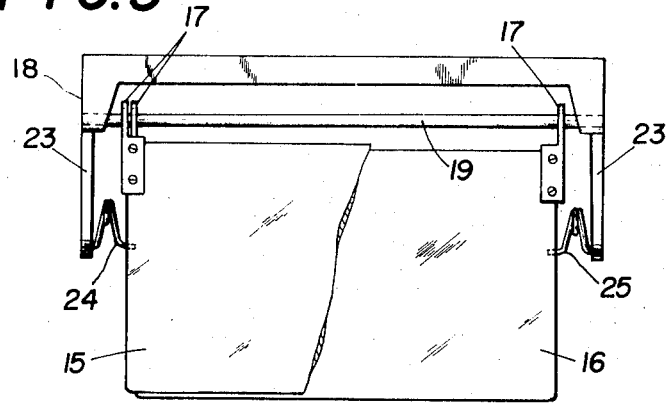
FIG. 5 is an illustration when

FIGS. 4 and 5 show an example wherein permanent magnets are not used, and instead the filters 15 and 16 are selectively positioned by means of spring. It should be understood, however, that in FIGS. 4 and 5, permanent magnets 21 and 22 are shown for the sake of convenience of explanation, but that these magnets should not be understood to be indispensable. In the example shown, the filter supporting portion 18 has an extension to provide an arm 23 at which one end of an spring is pivotably supported. More specifically, an end 241 of a spring 24 is pivotably secured in said arm 23. An intermediate portion of this spring is coiled to form a loop 242. The other end 243 of this spring 24 is pivotably secured to an end face of the filter 15 to impart the force of the spring 24 to this filter 15. For the other filter 16, another spring 25 is provided on the end face thereof opposite to said end face of the filter 15 so that the force of the spring 25 is imparted to the filter 16 in exactly the same manner as that described above (refer to FIG. 5).

With the foregoing arrangement, it will be noted that whenever the ends 241 and 243 of the spring 24 or 25 are in the positions shown by B in FIG. 4 wherein these ends are aligned on a single straight line on the extension of the arm 23, the spring 24 or 25 is in its most heavily compressed condition, and that when the filter 24 or 25 is tilted in the direction of the arrow C or D, the filter 15 or 16 is brought into pressure contact with the free end portion of the lower rear wall 101 or with the permanent magnet 21 and is held there, or at an intermediate site of the stay 8 or to the permanent magnet 22 thereon and is held there.

In the embodiment described above, description has been made wherein two filters are employed. Needless to say, the use of more than two filters is also possible.

Figure 8:
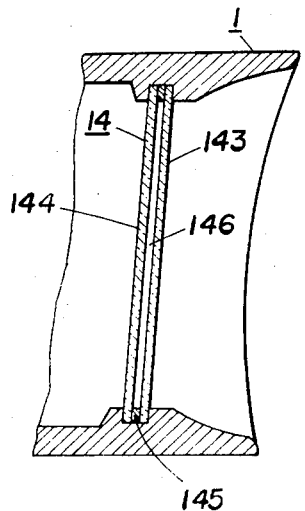
FIGS. 8 to 10 are fragmentary sectional views showing some examples of transparent cover which are arranged to be free from producing frost on their inner surfaces.
Figure 9:
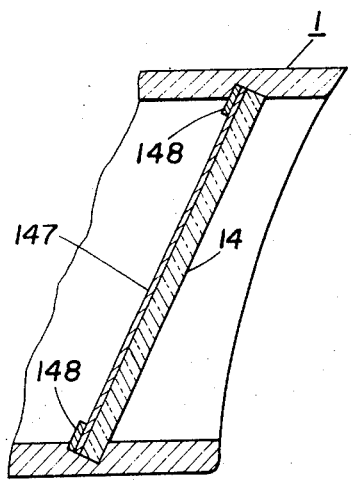
Figure 10:
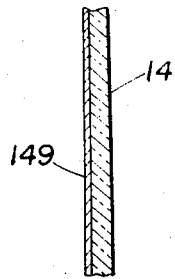

In the rear vision mirror apparatus of the present invention having the foregoing arrangement, the inside portion of the housing is partitioned and shuttered from the outside thereof by the transparent cover. In case there a difference in temperature exists between the inside and the outside of the housing, frost may develop on the inside surface of the transparent cover due to the condensation of water vapor, and accordingly the viewing of the rear field of vision may be obstructed. FIGS. 8 – 10 show some examples of transparent cover structures intended for the prevention of such frost formation.

More specifically, the arrangement shown in FIG. 8 is such that a transparent cover is constructed with transparent plates 143 and 144 and a spacer 145 sandwiched therebetween to form a tightly closed space 146 between these two transparent plates. Dry air is enclosed in this space 146. This dry air serves to thermally isolate the external atmosphere from the inner atmosphere to prevent the development of frost on the inner surfaces of the transparent plates 143 and 144.

The arrangement shown in FIG. 9 is structured such that the inner surface of a transparent cover 14 is coated with an electroconductive film 147, and electrodes 148, 148 are provided at both ends of said coated surface 147, and these two electrodes are connected via a switch (not shown) to a power source (not shown). This arrangement is operative so that whenever frost is formed, the transparent cover 14 is heated by turning on the switch 14.

The arrangement shown in FIG. 10 is comprised of a transparent cover 14 whose inner surface is coated with a transparent hygroscopic synthetic resin film 149 so that moisture is absorbed by said transparent hygroscopic synthetic resin film to prevent frost from developing at the inner surface of the cover 14.

We claim:

1. A rear vision mirror apparatus of the periscope type for providing a rear field of vision via the roof top of an automobile, comprising: a cylindrical housing fixed to the roof top and having an open rear end and an open front lower portion adapted to open into an upper part of the driver's chamber; an objective mirror and a reflecting mirror arranged in said housing; an eye-piece mirror provided below said open front lower portion of the housing for receiving incident light transmitted via said objective mirror and said reflecting mirror; at least two filters provided between said reflecting mirror and said eye-piece mirror and arranged in such a way that these filters may be selectively positioned either in a plane transverse to the path of light or at a position remote from this path of light, one of said filters having a transmission rate of between 50 percent and 75 percent for light having a wavelength between 400 m$\mu$ and 700 m$\mu$, a second of said filters having a transmission rate below 35 percent for light having a wavelength above 600 m$\mu$, such that the amount of visable light rays received may be substantially uniformly reduced over the entire spectrum of visable light rays by said first filter and the amount of light rays received from headlight lamps may be largely reduced by said second filter for a range of wavelengths representing a large proportion of the light output of said headlight lamps; a stay extending from and fixed to each of the opposite sides of the open front lower portion of the housing for supporting said eye-piece mirror; a plurality of filter supports, one extending from and fixed to each of the opposite sides of said open front lower portion of the housing and being spaced from said stay, said eye-piece mirror being selectively pivotably secured to the lower end of said stay; a shaft extending between and supported by said filter supports located on both sides of the open front lower portion of the housing, said at least two filters being pivotably secured at one of the side edges thereof to said shaft; a first spring, said filter supports each having an extension to provide a site for rotatably attaching one end of said first spring thereto, said first spring having a loop formed intermediately thereof, one end of said first spring being rotably attached to said site of the extension and the other end being rotatably attached to one end edge of one of said filters; and a second spring positioned between the site of the extension of the oppositely located support and one end edge of the other of said filters, whereby the filters may be set selectively to the position transverse to the path of light and to the position remote from this path of light.

2. A rear vision mirror apparatus according to claim 1, further comprising a transparent cover sealing the rear end opening of the cylindrical housing.

3. A rear vision mirror apparatus according to claim 1, in which said transparent cover is composed of two transparent plates having a space sealed therebetween, said sealed space being filled with a dry gas.

4. A rear vision mirror apparatus according to claim 1, in which said transparent cover has an electroconductive transparent film formed on the inner surface thereof, said electroconductive film being adapted to be heated by conducting an electric current thereto.

5. A rear vision mirror apparatus according to claim 1, in which said transparent cover has an hygroscopic transparent synthetic resin film formed on the inner surface thereof.

6. A rear vision mirror apparatus according to claim 1, in which said objective mirror, said reflecting mirror and said eye-piece mirror are planar mirrors.

* * * * *